United States Patent
Bors et al.

(10) Patent No.: US 6,303,188 B1
(45) Date of Patent: Oct. 16, 2001

(54) METHOD FOR IMPROVING THE DIRT-RESISTANCE AND GLOSS RETENTION OF A COALESCENT-FREE COATING

(75) Inventors: Daniel A. Bors, Warminster; Ann R. Hermes, Ambler; Joseph M. Rokowski, Riegelsville; David G. Speece, Reading, all of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 08/272,438

(22) Filed: Jul. 8, 1994

Related U.S. Application Data

(62) Division of application No. 08/080,894, filed on Jun. 22, 1993, now abandoned.

(51) Int. Cl.[7] ................................ B05D 5/00; B05D 3/00
(52) U.S. Cl. .................................... 427/385.5; 427/388.1; 427/397
(58) Field of Search ............................ 427/372.2, 385.5, 427/388.1, 397, 487, 491

(56) References Cited

U.S. PATENT DOCUMENTS

| | | | |
|---|---|---|---|
| 3,554,987 | * 1/1971 | Smith | 526/316 |
| 3,607,834 | 9/1971 | Marx et al. | 526/316 |
| 3,644,316 | 2/1972 | Marx et al. | |
| 4,296,226 | 10/1981 | Braun et al. | |
| 4,421,889 | 12/1983 | Braun et al. | |
| 5,053,452 | * 10/1991 | Spada | 524/707 |
| 5,215,827 | 6/1993 | Dotzauer et al. | |
| 5,278,227 | * 1/1994 | Bernard | 524/817 |
| 5,296,530 | 3/1994 | Bors et al. | 524/558 |

FOREIGN PATENT DOCUMENTS 2057768   6/1992   (CA) .

OTHER PUBLICATIONS

Pending Patent Application SN 08/114,117 filed Aug. 20, 1993.
Pending Patent Application SN07/920,972 filed Jul. 28, 1992.
Pending Patent Application SN 08/114,117 filed Aug. 30, 1993.

* cited by examiner

Primary Examiner—Christopher Henderson
(74) Attorney, Agent, or Firm—Ronald D. Bakule

(57) ABSTRACT

A method for improving the dirt pick-up resistance and the retention of gloss on exposure to light of a dried coating formed from a coalescent-free aqueous coating composition is provided. The coalescent-free composition composition contains an aqueous emulsion-polymerized polymeric binder having a glass transition temperature from about −35 C. to about +25 C. with from about 2% to about 20%, by weight based on the weight of the polymeric binder, of at least one copolymerized ethylenically-unsaturated active methylene monomer.

5 Claims, No Drawings

METHOD FOR IMPROVING THE DIRT-RESISTANCE AND GLOSS RETENTION OF A COALESCENT-FREE COATING This application is a division of application Ser. No. 08/080,894, filed Jun. 22, 1993 abandoned.

FIELD OF THE INVENTION

This invention relates to a method for improving the dirt-resistance and gloss retention of a coalescent-free coating composition.

BACKGROUND OF THE INVENTION

When coatings incorporate an emulsion-polymerized polymer as binder, there is a need for a soft binder polymer, i.e., a polymer with a glass transition temperature (Tg), and, more particularly, a minimum film formation temperature (MFFT), lower than the temperature of application of the coating, so that facile film formation via fusion of the emulsion-polymerized polymer particles can be achieved; at the same time there is a need for the surface hardness, dirt-resistance, outdoor durability, etc. characteristic of a harder polymer, i.e., a polymer with a Tg higher than the temperature of use of the coating. One solution to this problem is using a high Tg coatings binder formulated with a coalescent or volatile plasticizer so as to temporarily achieve the facile film formation characteristics of a low Tg binder along with the coatings film properties of a higher Tg polymer after the coalescent has evaporated. However, concerns regarding the odor and toxicity of some organic solvent coalescents and current and projected legislation limiting the amount of volatile organic compounds allowable in coatings have made low or no coalescent coatings desirable.

DESCRIPTION OF THE PRIOR ART

U.S. Pat. No. 4,421,889 discloses dispersion paints with high wet adhesion which are obtained by incorporating into the binder from 0.5 to 10%, by weight, acetoacetic acid ester monomers and by incorporating into the paint from 3% to 20%, by weight relative to the total weight of the paint, organic solvent film consolidation agents.

The problem faced by the inventor was to provide a coating composition substantially free from coalescent, the dry coating having improved dirt resistance and improved gloss retention. Improved dirt resistance and improved gloss retention are defined relative to the dirt resistance and gloss retention of a coating composition containing a binder with a Tg sufficiently low to permit facile film formation without the use of coalescent.

SUMMARY OF THE INVENTION

This invention is directed to a method for providing improved dirt pick-up resistance and improved gloss retention for a coalescent-free aqueous coating composition containing an aqueous emulsion-polymerized polymeric binder having a glass transition temperature from about −35 C. to about +25 C., wherein the binder contains from about 2% to about 20%, by weight based on the weight of said polymeric binder, of at least one copolymerized ethylenically-unsaturated active methylene monomer. Preferred as an active methylene monomer is an ethylenically-unsaturated monomer bearing acetoacetate functionality.

Examples of monomers useful for introduction of acetoacetate functionality are acetoacetoxyethyl acrylate, acetoacetoxyethyl methacrylate (AAEM), acetoacetoxypropyl methacrylate (AAPM), allyl acetoacetate, acetoacetoxybutyl methacrylate, 2,3-di(acetoacetoxy)propyl methacrylate and the like. In general, any polymerizable hydroxy functional monomer can be converted to the corresponding acetoacetate by reaction with diketene or other suitable acetoacetylating agent (See e.g. *Comparison of Methods for the Preparation of Acetoacetylated Coating Resins,* Witzeman, J. S.; Dell Nottingham, W.; Del Rector, F. J. Coatings Technology; Vol. 62, 1990, 101 (and references contained therein)).

The polymeric binder also contains from about 80% to about 95% by weight, based on the weight of the polymeric binder, of at least one copolymerized ethylenically-unsaturated monomer. For example, acrylic ester monomers including methyl acrylate, ethyl acrylate, butyl acrylate, 2-ethylhexyl acrylate, decyl acrylate, methyl methacrylate, butyl methacrylate, hydroxyethyl acrylate, hydroxyethyl methacrylate, and hydroxypropyl methacrylate; acrylamide or substituted acrylamides; styrene or substituted styrenes; butadiene; vinyl acetate or other vinyl esters; vinyl monomers such as vinyl chloride, vinylidene chloride, N-vinyl pyrollidone; acrylonitrile or methacrylonitrile; may be used. Low levels of copolymerized ethylenically-unsaturated acid monomers such as, for example, 0.1%–7%, by weight based on the weight of the polymeric binder, acrylic acid, methacrylic acid, crotonic acid, phosphoethyl methacrylate, 2-acrylamido-2-methyl- 1-propanesulfonic acid, sodium vinyl sulfonate, itaconic acid, fumaric acid, maleic acid, monomethyl itaconate, monomethyl fumarate, monobutyl fumarate, and maleic anhydride may be used.

The polymeric binder used in this invention is a substantially thermoplastic, or substantially uncrosslinked, polymer when it is applied to the substrate, although low levels of deliberate or adventitious crosslinking may be present. When low levels of precrosslinking or gel content are desired low levels of multi-ethylenically unsaturated monomers such as, for example, 0.1%–5%, by weight based on the weight of the polymeric binder, allyl methacrylate, diallyl phthalate, 1,4-butylene glycol dimethacrylate, 1,6-hexanedioldiacrylate, and the like, may be used. It is important, however, that the quality of the film formation is not materially impaired.

The glass transition temperature of the polymeric binder is from about −35 C. to about +25 C., as measured by differential scanning calorimetry (DSC). The emulsion polymer samples are dried, preheated to 120 C., rapidly cooled to −100 C., and then heated to 150 C. at a rate of 20 C./minute while data is being collected. The Tg is measured at the midpoint using the half-height method.

The emulsion polymerization techniques used to prepare such dispersions are well known in the art. Conventional surfactants may be used such as, for example, anionic and/or nonionic emulsifiers such as alkali or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, ammonium and/or alkali persulfates, typically at a level of 0.05% to 3.0% by weight, based on the weight of total monomer. Redox systems using the same initiators coupled with a suitable reductant such as, for example, isoascorbic acid and sodium bisulfite may be used at similar levels.

The particle size of the emulsion-polymerized polymeric binder is from about 50 nanometers to about 500 nanometers in diameter. The particles may be composed of two or more phases such as, for example, core/shell particles, core/shell particles with shell phases incompletely encapsulating the core, core/shell particles with a multiplicity of cores, interpenetrating network particles, and the like.

In addition to the polymeric binder, the coalescent-free aqueous coating composition may contain conventional coating components such as, for example, emulsifiers, pigments, fillers, anti-migration aids, curing agents, wetting agents, biocides, anti-foaming agents, colorants, waxes, and anti-oxidants.

The coalescent-free aqueous coating composition is free from volatile organic compounds. "Coalescent-free" as used herein means that the coating composition does not contain "volatile organic compounds" defined herein as organic compounds having a boiling point at atmospheric pressure of less than about 250 C., as may materially contribute to pollution, toxicity, and/or volatile organic content of the coating compositions. "Coalescent-free" composition is not to be taken as excluding compositions which contain very low levels of deliberately or adventitiously added volatile organic compounds such as, for example, volatile organic compounds incorporated in certain commercial initiator or surfactant compositions, volatile organic compounds formed during the polymerization reaction, and volatile organic compound impurities; in any event the level of volatile organic compounds is less than about 2% by weight, based on the dry weight of the polymeric binder.

In one embodiment of this invention acetoacetyl-functional polymeric binders are treated with an excess of a stoichiometric amount of ammonia or primary amine to form enamine, which may react more quickly when exposed to ultraviolet light than an untreated sample of the same acetoacetyl functional polymer. And, vinyl polymers containing pendant acetoacetate are prone to hydrolysis in water particularly on heat aging. However, this problem may be eliminated by treating the aqueous acetoacetate polymer, after preparation and neutralization, with one molar equivalent of ammonia or a primary amine such as ethanolamine, methyl amine, isopropyl amine, ethanol amine, or diglycol amine.

The substrates to which the coating composition of this invention may be applied include wood, plastic, metal, plaster, cementitious and asphaltic substrates, previously primed or coated substrates, and the like. Preferred substrates are indoor and outdoor architectural substrates such as walls, ceilings, floors, and the like. The coating composition of this invention may be applied to a substrate by methods well known in the art of applying coatings such as air-assisted spray, airless spray, brush, roller, squeege, and the like.

The following examples are intended to illustrate the method for providing a coating composition with improved dirt pick-up resistance to which this invention is directed. They are not intended to limit the invention as other applications of the invention will be obvious to those of ordinary skill in the art.

EXAMPLE 1
Preparation of Acetoacetate Functional Polymeric Binder

Preparation of Sample 1. To a 5 liter flask containing 1500 g. deionized (DI) water at 85 C. was added 18.6 g. anionic surfactant (TRITON XN-45S; 58% active), 100 g. Monomer Emulsion 1 (ME1), and 3.6 g. ammonium persulfate dissolved in 20 g. water, in that order. After 12 minutes the addition of 7.2 g. sodium carbonate dissolved in 85 g. water was carried out over a period of 43 minutes. Five minutes after the beginning of the sodium carbonate addition, with the temperature at 85 C., the gradual addition of the balance of ME1 and a solution of 1.8 g. ammonium persulfate dissolved in 100 g. water was begun. The ammonium persulfate feed took 162 minutes and the ME1 feed took 163 minutes, with the temperature at 85 C. throughout. A solution of 10 g. of 0.1% ferrous sulfate and 1 g. of 1% Versene was added along with 1.4 g. of 70% t-butyl hydroperoxide in 28 g. water and 0.7 g. isoascorbic acid in 20 g. water. With the temperature at 40 C. 29% ammonium hydroxide was added to pH=9. The latex had a solids content of 44.1%, a particle size of 94 nanometers (BI90), and Tg=14 C.

TABLE 1.1

| Monomer Emulsion 1 (ME1) | |
|---|---|
| DI water | 405 g. |
| Anionic Surfactant (TRITON XN-45S; 58% active) | 20.4 g. |
| Butyl acrylate | 936 g. |
| Methyl methacrylate | 702 g. |
| Methacrylic acid | 27.0 g. |
| AAEM | 135 g. |

EXAMPLE 2
Preparation of Acetoacetate Functional Polymeric Binder

Preparation of Sample 2. To a 5 liter flask containing 1500 g. deionized (DI) water at 85 C. was added 18.6 g. anionic surfactant(TRITON XN-45S; 58% active), 100 g. Monomer Emulsion 1 (ME1), and 3.6 g. ammonium persulfate dissolved in 20 g. water, in that order. After 12 minutes the addition of 7.2 g. sodium carbonate dissolved in 85 g. water was carried out over a period of 40 minutes. Five minutes after the beginning of the sodium carbonate addition, with the temperature at 85 C., the gradual addition of the balance of ME1 and a solution of 1.8 g. ammonium persulfate dissolved in 100 g. water was begun. The ammonium persulfate feed took 165 minutes and the ME1 feed took 190 minutes, with the temperature at 85 C. throughout. A solution of 10 g. of 0.1% ferrous sulfate and 1 g. of 1% Versene was added along with 1.4 g. of 70% t-butyl hydroperoxide in 28 g. water and 0.7 g. isoascorbic acid in 28 g. water. With the temperature at 40 C. 28% ammonium hydroxide was added to pH=9.0. The latex had a solids content of 43.7%, a particle size of 91 nanometers (BI 90), and Tg=−31 C.
Table 2.1 Monomer Emulsion 1 (ME1)

TABLE 2.1

| Monomer Emulsion 1 (ME1) | |
|---|---|
| DI water | 405 g. |
| Anionic Surfactant (TRITON XN-45S; 58% active) | 20.3 g. |
| Butyl acrylate | 1593 g. |
| Methacrylic acid | 27.0 g. |
| AAEM | 180 g. |

EXAMPLE 3
Preparation of Acetoacetate-functional Styrene/Acrylic Polymeric Binder Preparation of Sample 3. To a 5 liter flask containing 1500 g. deionized (DI) water at 85 C. was added 18.6 9. anionic surfactant (TRITON XN-45S; 58% active), 100 g. Monomer Emulsion 1 (ME1), and 3.6 9. ammonium persulfate dissolved in 20 9. water, in that order. After 12 minutes the addition of 7.2 g. sodium carbonate dissolved in 85 g. water was carried out over a period of 40 minutes. Five minutes after the beginning of the sodium carbonate addition, with the temperature at 85 C., the gradual addition of the balance of ME1 and a solution of 1.8 g. ammonium persulfate dissolved in 100 g. water was begun. The ammonium persulfate feed took 176 minutes and the ME1 feed took 186 minutes, with the temperature at 85 C. throughout. A solution of 10 g. of 0.1% ferrous sulfate and 1 g. of 1% Versene was added along with 1.4 g. of 70% t-butyl hydroperoxide in 28 g. water and 0.7 g. isoascorbic acid in 28 g. water. With the temperature at 40 C. 29% ammonium hydroxide was added to pH=9.3. The latex had a solids content of 43.4%, a particle size of 95 nanometers (BI 90), and Tg=7 C.

TABLE 3.1

| Monomer Emulsion 1 (ME1) | |
| --- | --- |
| DI water | 405 g. |
| Anionic Surfactant (TRITON XN-45S; 58% active) | 20.3 g. |
| Butyl acrylate | 1080 g. |
| Styrene | 495 g. |
| Methacrylic acid | 27.0 g. |
| AAEM | 180 g. |

EXAMPLE 4

Preparation of Acetoacetate-functional Vinyl Acetate/Acrylic Polymeric Binder

Preparation of Sample 4. To a 5 liter flask containing 1000 g. deionized (DI) water at 61 C. was added 138 g. nonionic surfactant (TRITON X-405; 70% active), 20 g. water, 42.3 g. anionic surfactant (SIPONATE DS-4; 23% active), 20 g. water, 100 g. Monomer Emulsion 1 (ME1) prior to the addition of the AAEM, 0.46 g. acetic acid in 5 g. water, 16.7 g. 0.1% solution of ferrous sulfate, 0.46 g. ammonium persulfate dissolved in 5 g. water, and 0.46 g. sodium sulfoxylate formaldehyde in 5 g. water, in that order. The temperature which had dropped to 56 C., then rose to 64 C. and dropped to 58.8 C. in 5 minutes. With the temperature at 58.8 C., the gradual addition of the balance of ME1, a solution of 5.4 g. ammonium persulfate and 4.5 g. t-butyl hydroperoxide dissolved in 140 g. water, and a solution of 5.4 g. sodium bisulfite in 140 g. water was begun. After 174 minutes with the temperature at 68.5 C. 50 ml. water was added. Twenty-five minutes later with the temperature at 68.5 C. 50 ml. water was added. The persulfate/bisulfite feed took 245 minutes and the ME1 feed took 235 minutes. A solution of 2.0 g. of 70% t-butyl hydroperoxide in 10 g. water and 1.2 g. isoascorbic acid in 10 g. water was added. A solution of 6.5 g. sodium bicarbonate in 65 g. water was added. The latex had a solids content of 47.1%, pH=4.5, a particle size of 98 nanometers (BI-90), and Tg=9 C. The pH was then adjusted to pH=7.1 with ammonium hydroxide.

TABLE 4.1

| Monomer Emulsion 1 (ME1) | |
| --- | --- |
| DI water | 593 g. |
| Nonionic Surfactant (TRITON X-405; 70% active) | 13.9 g. |
| Sodium acetate | 2.1 g. |
| Butyl acrylate | 738.7 g. |
| Vinyl acetate | 1010 g. |
| AAEM | 194.4 g. |

EXAMPLE 5

Preparation of Low Level Acetoacetate-functional Polymeric Binder

Preparation of Sample 5. To a 5 liter flask containing 1500 g. deionized (DI) water at 85 C. was added 18.6 g. anionic surfactant (TRITON XN-45S; 58% active), 100 g. Monomer Emulsion 1 (ME1), and 3.6 g. ammonium persulfate dissolved in 20 g. water, in that order. The addition of 7.2 g. sodium carbonate dissolved in 85 g. water carried out. Simultaneously, the gradual addition of the balance of ME1 and a solution of 1.89 g. ammonium persulfate dissolved in 105 g. water was begun. The ammonium persulfate feed took 186 minutes and the ME1 feed took 187 minutes, with the temperature at 85–86 C. throughout. Then, 40 g. water, a solution of 10 g. of 0.1% ferrous sulfate and 1 g. of 1% Versene was added along with 1.4 g. of 70% t-butyl hydroperoxide in 8 g. water and 0.7 g. isoascorbic acid in 20 g. water. With the temperature at 37 C., 29% ammonium hydroxide was added to pH=9.1. The latex had a solids content of 44.3%, and a particle size of 90 nanometers (BI 90).

TABLE 5.1

| Monomer Emulsion 1 (ME1) | |
| --- | --- |
| DI water | 405 g. |
| Anionic Surfactant (TRITON XN-45S; 58% active) | 20.5 g. |
| Butyl acrylate | 990.1 g. |
| Methyl methacrylate | 737.6 g. |
| Methacrylic acid | 27.1 g. |
| AAEM | 45.2 g. |

EXAMPLE 6

Preparation of Acetoacetate-functional Polymeric Binder

Preparation of Sample 6. To a 5 liter flask containing 1500 g. deionized (DI) water at 83 C. was added 34.9 g. anionic surfactant(SIPONATE DS-4; 23% active), 100 g. Monomer Emulsion 1 (ME1), and 3.6 g. ammonium persulfate dissolved in 20 g. water, in that order. Fourteen minutes later, addition of 7.2 g. sodium carbonate dissolved in 85 g. water, the balance of ME1 and a solution of 1.8 g. ammonium persulfate dissolved in 100 g. water was begun. The addition of sodium carbonate took 41 minutes; the ammonium persulfate feed took 172 minutes; and the ME1 feed took 169 minutes, with the temperature at 81–82 C. throughout. Then, a solution of 10 g. of 0.1% ferrous sulfate and 1 g. of 1% Versene was added along with 1.4 g. of 70% t-butyl hydroperoxide(70%) in 30 g. water and 0.7 g. isoascorbic acid in 30 g. water. With the temperature at 40 C., 29.5% ammonium hydroxide was added to pH=9.1. At 39 C., 3.5 g. of 17% PROXEL GXL in 5 g. water was added. The latex had a solids content of 43.4% and a particle size of 111 nanometers (BI 90).

TABLE 6.1

| Monomer Emulsion 1 (ME1) | |
| --- | --- |
| DI water | 355 g. |
| Anionic Surtactant (SIPONATE DS-4; 23% active) | 34.9 g. |
| Butyl acrylate | 989.9 g. |
| Methyl methacrylate | 602.8 g. |
| Methacrylic acid | 27.0 g. |
| AAEM | 180.1 g. |

EXAMPLE 7

Preparation of Acetoacetate-functional Polymeric Binder

Preparation of Sample 7. To a 5 liter flask containing 1150 g. deionized (DI) water at 85 C. was added 11.0 g. anionic surfactant (TRITON XN-45S; 58% active) mixed with 30 g. water, 10.2 g. sodium carbonate dissolved in 70 g. water, 117 g. Monomer Emulsion 1 (ME1) , and 5.0 g. ammonium persulfate dissolved in 35 g. water, in that order. After twelve minutes, addition the balance of ME1 and a solution of 1.3 g. ammonium persulfate dissolved in 90 g. water was begun. The ammonium persulfate and ME1 feeds took 180 minutes, with the temperature at 83 C. throughout. Then, a solution of 10 g. of 0.1% ferrous sulfate and 1 g. of 1% Versene was added along with 1.6 g. of 70% t-butyl hydroperoxide in 40 g. water and 0.8 g. isoascorbic acid in 40 g. water. With the temperature at 40 C., 29% ammonium hydroxide was added to pH=9.2. At 37 C., 4 g. of 17% PROXEL GXL in 6 g. water was added. The latex had a solids content of 50.3% and a particle size of 118 nanometers (BI-90).

TABLE 7.1

| Monomer Emulsion 1 (ME1) | |
|---|---|
| DI water | 310 g. |
| Anionic surfactant (TRITON XN-45S; 58% active) | 38.5 g. |
| Butyl acrylate | 1158 g. |
| Methyl methacrylate | 706 g. |
| Methacrylic acid | 31.5 g. |
| AAEM | 210 g. |

EXAMPLE 8

Preparation of Acetoacetate-functional Polymeric Binder

Preparation of Sample 8. To a 5 liter flask containing 1500 g. deionized (DI) water at 82 C. was added 6.1 g. anionic surfactant (sodium lauryl sulfate; 100% active) dissolved in 30 g. water, 100 g. Monomer Emulsion 1 (ME1) , and 3.6 g. ammonium persulfate dissolved in 15 g. water, in that order. Twelve minutes later, addition of 7.2 g. sodium carbonate dissolved in 85 g. water, the balance of ME1 and a solution of 1.8 g. ammonium persulfate dissolved in 100 g. water was begun. The addition of sodium carbonate took 35 minutes; the ammonium persulfate feed took 178 minutes; and the ME1 feed took 168 minutes, with the temperature at 82 C. throughout. Then, a solution of 10 g. of 0.1% ferrous sulfate and 1 g. of 1% Versene was added along with 1.4 g. of 70% t-butyl hydroperoxide in 30 g. water and 0.7 g. isoascorbic acid in 30 g. water. With the temperature at 40 C., 29% ammonium hydroxide was added to pH=9. At 39 C., 3.5 g. of 17% PROXEL GXL in 5 g. water was added. The latex had a solids content of 43.1% and a particle size of 99 nanometers (BI 90).

TABLE 8.1

| Monomer Emulsion 1 (ME1) | |
|---|---|
| DI water | 415 g. |
| Anionic surfactant (sodium lauryl sulfate; 100% active) | 6.1 g. |
| Butyl acrylate | 990 g. |
| Methyl methacrylate | 603 g. |
| Methacrylic acid | 27 g. |
| AAEM | 180 g. |

EXAMPLE 9

Preparation of High Level Acetoacetate-functional Polymeric Binder

Preparation of Sample 9. To a 5 liter flask containing 1100 g. deionized (DI) water at 82 C. was added 20 g. anionic surfactant (SIPONATE DS-4; 23% active), 161 g. Monomer Emulsion 1 (ME1) , and 3.6 g. sodium persulfate dissolved in 50 g. water, in that order. Ten minutes later, addition of the balance of ME1 and a solution of 2.1 g. sodium persulfate dissolved in 50 g. water was begun. The addition of sodium persulfate feed took 126 minutes; and the ME1 feed took 126 minutes, with the temperature at 81 C. throughout. Then, a solution of 5 g. of 0.1% ferrous sulfate and 5 g. of 1% Versene was added along with 4 g. of 70% t-butyl hydroperoxide in 20 g. water and 1.4 g. isoascorbic acid in 10 g. water. With the temperature at 40 C., 28% ammonium hydroxide was added to pH=9.1. The latex had a solids content of 37.9% and a particle size of 135 nanometers (BI 90).

TABLE 9.1

| Monomer Emulsion 1 (ME1) | |
|---|---|
| DI water | 910 g. |
| Anionic surfactant (SIPONATE DS-4; 23% active) | 12.4 g. |
| Butyl acrylate | 786.5 g. |
| Methyl methacrylate | 291.3 g. |
| Acrylic acid | 18.6 g. |
| AAEM | 286 g. |
| Methacryloxyalkylene urea(30%)[1] | 47.6 g. |

[1]As disclosed in DE 4,010,532

EXAMPLE 10

Preparation of Acetoacetate-functional Polymeric Binder

Preparation of Sample 10. To a 5 liter flask containing 1500 g. deionized (DI) water at 84 C. was added 18.6 g. anionic surfactant(TRITON XN-45S; 58% active), 100 g. Monomer Emulsion 1 (ME1) , and 3.6 g. ammonium persulfate dissolved in 20 g. water, in that order. After twelve minutes, addition of 7.2 g. sodium carbonate dissolved in 85 g. water was carried out over 40 minutes. Five minutes after the beginning of the sodium carbonate addition, with the temperature at 84 C., the gradual addition of the balance of ME1 and a solution of 1.8 g. ammonium persulfate dissolved in 100 g. water was begun. The ammonium persulfate feed took 159 minutes and the ME1 feed took 173 minutes, with the temperature at 84 C. throughout. Then, a solution of 10 g. of 0.1% ferrous sulfate and 1 g. of 1% Versene was added along with 1.4 g. of 70% t-butyl hydroperoxide(70%) in 28 g. water and 0.7 g. isoascorbic acid in 20 g. water. With the temperature at 40 C., 29% ammonium hydroxide was added to pH=9.3. The latex had a solids content of 44.6% and a particle size of 93 nanometers (BI-90).

TABLE 10.1

| Monomer Emulsion 1 (ME1) | |
|---|---|
| DI water | 405 g. |
| Anionic Surfactant (TRITON XN-45S; 58% active) | 20.4 g. |
| 2-Ethylhexyl acrylate | 867.6 g. |
| Methyl methacrylate | 770 g. |
| Methacrylic acid | 27 g. |
| AAEM | 135 g. |

EXAMPLE 11
Preparation of Acetoacetate-functional Polymeric Binder

Preparation of Sample 11. To a 5 liter flask containing 780 g. deionized (DI) water at 86 C. was added 3.6 g. inhibitor (0.5% active), 14.3 g. anionic surfactant (sodium lauryl sulfate; 28% active), 75 g. Monomer Emulsion 1 (ME1), 7.6 g. sodium carbonate dissolved in 35 g. water, and 7.1 g. ammonium persulfate dissolved in 30 g. water, in that order. Six minutes later, addition of the balance of ME1 and a solution of 1.2 g. ammonium persulfate dissolved in 98 g. water was begun. The addition of ammonium persulfate and the ME1 feed took 164 minutes, with the temperature at 82 C. throughout. Then, a solution of 9 g. of 0.1% ferrous sulfate was added along with 1.4 g. of 70% t-butyl hydroperoxide(70%) in 8 g. water and 0.7 g. isoascorbic acid in 20 g. water. With the temperature at 39 C., 28% ammonium hydroxide was added to pH=9.1. The latex had a solids content of 51.3% and a particle size of 158 nanometers (BI 90).

TABLE 11.1

| Monomer Emulsion 1 (ME1) | |
|---|---|
| DI water | 785 g. |
| Anionic surfactant (sodium lauryl sulfate; 28% active) | 25.6 g. |
| Butyl acrylate | 1187.9 g. |
| Methyl methacrylate | 734.3 g. |
| Methacrylic acid | 21.6 g. |
| AAEM | 216 g. |

Comparative Example A
Preparation of Comparative Polymeric Binder

Preparation of Comparative Sample A. To a 5 liter flask containing 1500 g. deionized (DI) water at 85 C. was added 18.6 g. anionic surfactant (TRITON XN-45S; 58% active), 100 g. Monomer Emulsion 1 (ME1), and 3.6 g. ammonium persulfate dissolved in 20 g. water, in that order. After 12 minutes the addition of 7.2 g. sodium carbonate dissolved in 85 g. water carried out over a period of 40 minutes. Five minutes after the beginning of the sodium carbonate addition, with the temperature at 85 C., the gradual addition of the balance of ME1 and a solution of 1.8 g. ammonium persulfate dissolved in 100 g. water was begun. The ammonium persulfate feed and the ME1 feed took 192 minutes, with the temperature at 85 C. throughout. A solution of 10 g. of 0.1% ferrous sulfate and 1 g. of 1% Versene was added along with 1.4 g. of 70% t-butyl hydroperoxide in 28 g. water and 0.7 g. isoascorbic acid in 28 g. water. With the temperature at 40 C. 29% ammonium hydroxide was added to pH=9.2. The latex had a solids content of 45.1%, particle size of 98 nanometers (BI 90), and Tg=16 C.

TABLE A.1

| Monomer Emulsion 1 (ME1) | |
|---|---|
| DI water | 405 g. |
| Anionic Surfactant (TRITON XN-45S; 70% active) | 20.3 g. |
| Butyl acrylate | 936 g. |
| Methyl methacrylate | 837 g. |
| Methacrylic acid | 27.0 g. |

Comparative Example B
Preparation of Low Tg Comparative Acrylic Polymeric Binder Preparation of Comparative Sample B. To a 5 liter flask containing 1500 g. deionized (DI) water at 85 C. was added 18.6 g. anionic surfactant (TRITON XN-45S; 58% active), 100 g. Monomer Emulsion 1 (ME1), and 3.6 g. ammonium persulfate dissolved in 20 g. water, in that order. After 12 minutes the addition of 7.2 g. sodium carbonate dissolved in 85 g. water carried out over a period of 40 minutes. Five minutes after the beginning of the sodium carbonate addition, with the temperature at 85 C., the gradual addition of the balance of ME1 and a solution of 1.8 g. ammonium persulfate dissolved in 100 g. water was begun. The ammonium persulfate feed took 165 minutes and the ME1 feed took 180 minutes, with the temperature at 85 C. throughout. A solution of 10 g. of 0.1% ferrous sulfate and 1 g. of 1% Versene was added along with 1.4 g. of 70% t-butyl hydroperoxide in 28 g. water and 0.7 g. isoascorbic acid in 28 g. water. With the temperature at 40 C. 28% ammonium hydroxide was added to pH=9.1. The latex had a solids content of 44.7%, a particle size of 91 nanometers (BI 90), and Tg=−29 C.

TABLE B.1

| Monomer Emulsion 1 (ME1) | |
|---|---|
| DI water | 405 g. |
| Anionic Surfactant (TRITON XN-45S; 58% active) | 20.3 g. |
| Butyl acrylate | 1593 g. |
| Methyl methacrylate | 180 g. |
| Methacrylic acid | 27.0 g. |

Comparative Example C
Preparation of Comparative Styrene/Acrylic Polymeric Binder Preparation of Comparative Sample C. To a 5 liter flask containing 1500 g. deionized (DI) water at 85 C. was added 18.6 g. anionic surfactant (TRITON XN-45S; 58% active), 100 g. Monomer Emulsion 1 (ME1), and 3.6 g. ammonium persulfate dissolved in 20 g. water, in that order. After 12 minutes 7.2 g. sodium carbonate dissolved in 85 g. water was added over a period of 40 minutes. Five minutes after the beginning of the sodium carbonate addition, with the temperature at 85 C., the gradual addition of the balance of ME1 and a solution of 1.8 g. ammonium persulfate dissolved in 100 g. water was begun. The ammonium persulfate feed took 169 minutes and the ME1 feed took 178 minutes, with the temperature at 85 C. throughout. A solution of 10 g. of 0.1% ferrous sulfate and 1 g. of 1% Versene was added along with 1.4 g. of 70% t-butyl hydroperoxide in 28 g. water and 0.7 g. isoascorbic acid in 28 g. water. With the temperature at 40 C. 29% ammonium hydroxide was added to pH=9. The latex had a solids content of 45.3%, particle size of 95 nanometers (BI 90), and Tg=7 C.

TABLE C.1

| Monomer Emulsion 1 (ME1) | |
|---|---|
| DI water | 405 g. |
| Anionic Surfactant (TRITON XN-45S; 58% active) | 20.3 g. |
| Butyl acrylate | 1080 g. |
| Methyl methacrylate | 180 g. |
| Styrene | 495 g. |
| Methacrylic acid | 27.0 g. |

Comparative Example D
Preparation of Comparative Vinyl Acetate/Acrylic Polymeric Binder Preparation of Comparative Sample D. To a 5 liter flask containing 1000 g. deionized (DI) water at 60 C. was added 138 g. nonionic surfactant (TRITON X-405; 70% active), 20 g. water, 42.3 g. anionic surfactant (SIPONATE DS-4; 23% active), 20 g. water, 100 g. Monomer Emulsion 1 (ME1) prior to the addition of the methyl methacrylate, 0.46 g. acetic acid in 5 g. water, 16.7 g. 0.1% solution of ferrous sulfate, 0.46 g. ammonium persulfate dissolved in 5 g. water, and 0.46 g. sodium sulfoxylate formaldehyde in 5 g. water, in that order. The temperature which had dropped to 58 C., then rose to 68 C. The gradual addition of the balance of ME1, a solution of 5.4 g. ammonium persulfate and 4.5 g. t-butyl hydroperoxide dissolved in 140 g. water, and a solution of 5.4 g. sodium bisulfite in 140 g. water was begun. After 170 minutes with the temperature at 68.5 C. 100 ml. water was added. The persulfate/bisulfite feed took 220 minutes and the ME1 feed took 215 minutes. A solution of 2.0 g. of 70% t-butyl hydroperoxide in 10 g. water and 1.2 g. isoascorbic acid in 10 g. water was added. A solution of 5 g. sodium bicarbonate in 50 g. water was added. The latex had a solids content of 49.2%, pH=4.4, a particle size of 98 nanometers (BI 90), and Tg=12. Ammonium hydroxide was then added to pH=7.1.

TABLE D.1

Monomer Emulsion 1 (ME1)

| | |
|---|---|
| DI water | 593 g. |
| Noionic Surfactant | 13.9 g. |
| (TRITON X-405; 70% active) | |
| Sodium acetate | 2.1 g. |
| Butyl acrylate | 738.7 g. |
| Vinyl acetate | 1010 g. |
| Methyl methacrylate | 192 g. |

Comparative Example E.

Preparation of Comparative Polymeric Binder

Preparation of Comparative Sample E. To a 5 liter flask containing 1500 g. deionized (DI) water at 85 C. was added 18.6 g. anionic surfactant (TRITON XN-45S; 58% active), 100 g. Monomer Emulsion 1 (ME1), and 3.6 g. ammonium persulfate dissolved in 20 g. water, in that order. After 12 minutes the addition of 7.2 g. sodium carbonate dissolved in 85 g. water carried out over a period of 40 minutes. Five minutes after the carbonate addition was begun, the gradual addition of the balance of ME1 and a solution of 1.8 g. ammonium persulfate dissolved in 100 g. water was begun. The ammonium persulfate feed and the ME1 feed took 172 minutes, with the temperature at 85 C. throughout. A solution of 10 g. of 0.1% ferrous sulfate and 1 g. of 1% Versene was added along with 1.4 g. of 70% t-butyl hydroperoxide in 28 g. water and 0.7 g. isoascorbic acid in 28 g. water. With the temperature at 40 C. 29% ammonium hydroxide was added to pH=9.1. The latex had a solids content of 45.1%, a particle size of 96 nanometers (BI 90), and Tg=13 C.

TABLE E.1

Monomer Emulsion 1 (ME1)

| | |
|---|---|
| DI water | 405 g. |
| Anionic Surfactant | 20.3 g. |
| (TRITON XN-45S: 58% active) | |
| Butyl acrylate | 990. g. |
| Methyl methacrylate | 783 g. |
| Methacrylic acid | 27 g. |

EXAMPLE 12

Preparation of Coalescent-free Aqueous Coating Composition

The following materials were combined and ground in a Cowles mill at high speed for 15 minutes. (All quantities are in grams)

| | |
|---|---|
| Water | 55.0 |
| Anionic Surfactant | 2.0 |
| (TRITON CF-10) | |
| Defoamer | 1.0 |
| (Witco BUBBLE BREAKER 625) | |
| Anionic Dispersant | 10.6 |
| (TAMOL 731) | |
| Urethane rheology modifier | 15.0 |
| (ACRYSOL RM-2020) | |
| Titanium dioxide | 265.1 |
| (TI-PURE R-902) | |

To the grind were added the following, in order, with slow stirring:

| | |
|---|---|
| Water | 17.0 |
| Polymeric binder (43.5% solids) | 551.0 |
| Defoamer | 1.0 |
| (Witco BUBBLE BREAKER 625) | |
| Nonionic surfactant | 2.4 |
| (TRITON X-100) | |
| Urethane rheology modifier | 13.0 |
| (ACRYSOL RM-2020) | |
| Urethane rheology modifier | 2.0 |
| Water | 128.6 |

The aqueous coating composition was allowed to equilibrate overnight and had the following properties: pH=8.9; Stormer viscosity=90 Krebs Units; and ICI viscosity=1.4 poises.

EXAMPLE 13

Evaluation of Dirt Pick-up Resistance

Samples 1–5 and Comparative Samples A–E were incorporated into coating compositions according to the procedure of Example 12. A portion of each coating was drawn-down onto an Aluminum "Q" panel using a 10 mil GARDCO 8-Path Wet Film Applicator. The samples were dried for one week at 25 C and 50% relative humidity). Then the panels bearing the samples were cut down to exactly 3 inches by 9 inches. Each panel was placed in a Weather-O-meter with the test area facing inward for 500 hours. The panels were then removed and Y-reflectance was measured using a PACIFIC SCIENTIFIC COLORGARD 45/0 Reflectometer (Gardner/Neotec Instrument Division). An average of three readings was taken. The panels were then placed in a fog box for 1.5 hours. The panels were removed, blotted dry and a uniform coating of the following Mapico 422 Iron dispersion was brushed on, leaving a 2 inch area at the top of the panel uncoated. Two drops of Tamol 731 were dissolved in 250 g. water and 125 g, Mapico 422 iron oxide were added; the mixture was dispersed using a Lightnin' mixer.

The slurry-coated test panels were air dried for 3 hours. The test panels were then placed in a 140 F. oven for 1 hour. They were removed and allowed to come to room temperature over a period of 30 minutes. Each panel was washed under tepid water while rubbing lightly and evenly with a new cheesecloth pad. The panels were air-dried for a minimum of 4 hours, and three reflectance readings were taken over the stained area, averaged together, and reported. Higher readings indicate better dirt pick-up resistance.

TABLE 13.1

Evaluation of dirt pick-up resistance

| Sample | Dirt Resistance (% Reflectance) |
|---|---|
| 1 | 66 |
| Comp. A | 37 |
| 2 | 72 |
| Comp. B | 19 |
| 3 | 57 |
| Comp. C | 25 |
| 4 | 40 |
| Comp. D | 18 |
| 5 | 44 |
| Comp. E | 34 |

Samples 1–5 of the method of this invention exhibit superior dirt pick-up resistance when compared to the respective Comparative Samples A–E.

EXAMPLE 14
Improved Gloss Retention

Samples 1–2 and Comparative Samples A–B were incorporated into coating compositions according to the procedure of Example 12. A portion of each coating was drawn-down onto an Aluminum "Q" panel using a 10 mil GARDCO 8-Path Wet Film Applicator. The samples were dried for one week at 25 C and 50% relative humidity. Then the panels bearing the samples were cut down to 3 inches by 9 inches. Each panel was placed in a QUV cabinet for the time indicated using UVA bulbs, the exposure designed to simulate accelerated outdoor exposure of the exposed samples. Then 20 degree and 60 degree gloss was measured using a Pacific Scientific Glossgard II glossmeter and % gloss retained for each angle was calculated as 100×(gloss of the exposed coating film) divided (gloss of the coating film unexposed ). Higher values indicate retention of gloss on exposure. Results are presented in Table 14.1.

TABLE 14.1

Gloss retention for accelerated outdoor exposure test (% Gloss Retained)

| Sample | Gloss | 104 hrs. exposure | 269 hrs. exposure |
|---|---|---|---|
| Ex. 1 | 20 degree | 73 | 52 |
| Comp. A | 20 degree | 59 | 43 |
| Ex. 1 | 60 degree | 92 | 87 |
| Comp. A | 60 degree | 88 | 84 |
| Ex. 2 | 20 degree | 92 | 68 |
| Comp. B | 20 degree | 48 | 32 |
| Ex. 2 | 60 degree | 96 | 97 |
| Comp. B | 60 degree | 81 | 77 |

Examples 1 and 2 of the method of this invention exhibit better gloss retention that do the comparatives, under a several measurement and exposure conditions.

We claim:

1. A method for improving the gloss retention on exposure to light of a dried coating formed from a coalescent-free aqueous coating composition comprising forming said coalescent-free coating composition, said composition comprising an aqueous emulsion-polymerized polymeric binder having a glass transition temperature from about −35 C. to about +25 C., said binder comprising from about 2% to about 20%, by weight based on the weight of said polymeric binder, of at least one copolymerized ethylenically-unsaturated active methylene monomer;

applying said coating composition to a substrate;

drying said coating composition; and exposing said coating composition to light.

2. The method of claim 1 wherein said active methylene monomer is an acetoacetate-functional monomer, or the enamine thereof.

3. The method of claim 1 wherein said active methylene monomer is acetoacetoxyethyl methacrylate, or the enamine thereof.

4. The method of claim 1 wherein said polymeric binder has a glass transition temperature from about −15 C. to about +15 C.

5. The method of claim 1 wherein said binder comprises from about 5% to about 10%, by weight based on the weight of said polymeric binder, of at least one ethylenically-unsaturated active methylene monomer.

* * * * *